(12) United States Patent
Zhu et al.

(10) Patent No.: US 11,200,680 B2
(45) Date of Patent: Dec. 14, 2021

(54) IMAGE PROCESSING METHOD AND APPARATUS

(71) Applicant: TENCENT TECHNOLOGY (SHENZHEN) COMPANY LIMITED, Shenzhen (CN)

(72) Inventors: Xiaolong Zhu, Shenzhen (CN); Kaining Huang, Shenzhen (CN); Jingmin Luo, Shenzhen (CN); Lijian Mei, Shenzhen (CN); Shenghui Huang, Shenzhen (CN); Yongsen Zheng, Shenzhen (CN); Yitong Wang, Shenzhen (CN); Haozhi Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 49 days.

(21) Appl. No.: 16/671,747

(22) Filed: Nov. 1, 2019

(65) Prior Publication Data

US 2020/0082542 A1 Mar. 12, 2020

Related U.S. Application Data

(63) Continuation of application No. PCT/CN2018/118644, filed on Nov. 30, 2018.

(30) Foreign Application Priority Data

Dec. 11, 2017 (CN) .......................... 201711307381.8

(51) Int. Cl.
*G06K 9/00* (2006.01)
*G06T 7/194* (2017.01)
*G06T 7/11* (2017.01)

(52) U.S. Cl.
CPC ................ *G06T 7/194* (2017.01); *G06T 7/11* (2017.01); *G06T 2207/20072* (2013.01);
(Continued)

(58) Field of Classification Search
CPC . G06T 7/194; G06T 7/11; G06T 2207/20072; G06T 2207/20081; G06T 2207/20084; G06T 2207/20156
(Continued)

(56) References Cited

U.S. PATENT DOCUMENTS

| 5,781,198 A | 7/1998 | Korn |
| 6,651,246 B1 | 11/2003 | Archambault et al. |

(Continued)

FOREIGN PATENT DOCUMENTS

| CN | 101588459 A | 11/2009 |
| CN | 102750535 A | 10/2012 |

(Continued)

OTHER PUBLICATIONS

Yang, Rui, et al. "Video segmentation via multiple granularity analysis." Proceedings of the IEEE Conference on Computer Vision and Pattern Recognition. 2017. (Year: 2017).*

(Continued)

*Primary Examiner* — Jonathan S Lee
(74) *Attorney, Agent, or Firm* — Anova Law Group, PLLC (57) ABSTRACT

An image processing method and a related apparatus are provided. The method is applied to an image processing device, and includes: obtaining an original image, the original image including a foreground object; extracting a foreground region from the original image through a deep neural network; identifying pixels of the foreground object from the foreground region; forming a mask according to the pixels of the foreground object, the mask including mask (Continued)

values corresponding to the pixels of the foreground object; and extracting the foreground object from the original image according to the mask.

20 Claims, 7 Drawing Sheets

(52) U.S. Cl.
CPC .............. *G06T 2207/20081* (2013.01); *G06T 2207/20084* (2013.01); *G06T 2207/20156* (2013.01)

(58) Field of Classification Search
USPC ......................................................... 382/157
See application file for complete search history.

(56) References Cited

U.S. PATENT DOCUMENTS

| | | | | |
|---|---|---|---|---|
| 10,032,281 | B1* | 7/2018 | Ghesu | G06N 7/005 |
| 10,937,169 | B2* | 3/2021 | Dharur | G06T 7/143 |
| 2011/0249190 | A1 | 10/2011 | Nguyen et al. | |
| 2016/0117832 | A1 | 4/2016 | Liu et al. | |

FOREIGN PATENT DOCUMENTS

| | | |
|---|---|---|
| CN | 103745456 A | 4/2014 |
| CN | 104463865 A | 3/2015 |
| CN | 104935832 A | 9/2015 |
| CN | 105120185 A | 12/2015 |
| CN | 105590309 A | 5/2016 |
| CN | 105631868 A | 6/2016 |
| CN | 105631880 A | 6/2016 |
| CN | 106204597 A | 12/2016 |
| CN | 106303161 A | 1/2017 |

OTHER PUBLICATIONS

Wu, Xiaoyu, and Yangsheng Wang. "Interactive foreground/background segmentation based on graph cut." 2008 Congress on Image and Signal Processing. vol. 3. IEEE, 2008. (Year: 2008).*

Kraus, Oren Z., Jimmy Lei Ba, and Brendan J. Frey. "Classifying and segmenting microscopy images with deep multiple instance learning." Bioinformatics 32.12 (2016): i52-i59. (Year: 2016).*

Chen, Chaocun, et al. "Vehicle type recognition based on multi-branch and multi-layer features." 2017 IEEE 2nd Advanced Information Technology, Electronic and Automation Control Conference (IAEAC). IEEE, 2017. (Year: 2017).*

The State Intellectual Property Office of the People's Republic of China (SIPO) Office Action 1 for 201711307381.8 dated Jul. 14, 2020 7 Pages (including translation).

The World Intellectual Property Organization (WIPO) International Search Report for PCT/CN2018/118644 dated Jan. 30, 2019 7 Pages (including translation).

* cited by examiner

IMAGE PROCESSING METHOD AND APPARATUS

CROSS-REFERENCES TO RELATED APPLICATIONS

This application is a continuation application of PCT Patent Application No. PCT/CN2018/118644, filed on Nov. 30, 2018, which claims priority to Chinese Patent Application No. 201711307381.8, entitled "IMAGE PROCESSING METHOD AND RELATED APPARATUS" filed with the China National Intellectual Property Administration on Dec. 11, 2017, the entire contents of both of which are incorporated herein by reference.

FIELD OF TECHNOLOGY

The present disclosure relates to the field of computer technologies, and specifically, to an image processing technology.

BACKGROUND OF THE DISCLOSURE

Mathematical image matting refers to a technology that separates foreground objects (for example, persons and vehicles) from existing natural images. The technology is first applied to special effects in the film and television industry and achieves huge commercial values for the film and television industry.

At the beginning, the mathematical image matting is limited to fixed background matting, for example, separating a foreground object (a person) from a blue background in a portrait picture with the blue background.

Figure 1:
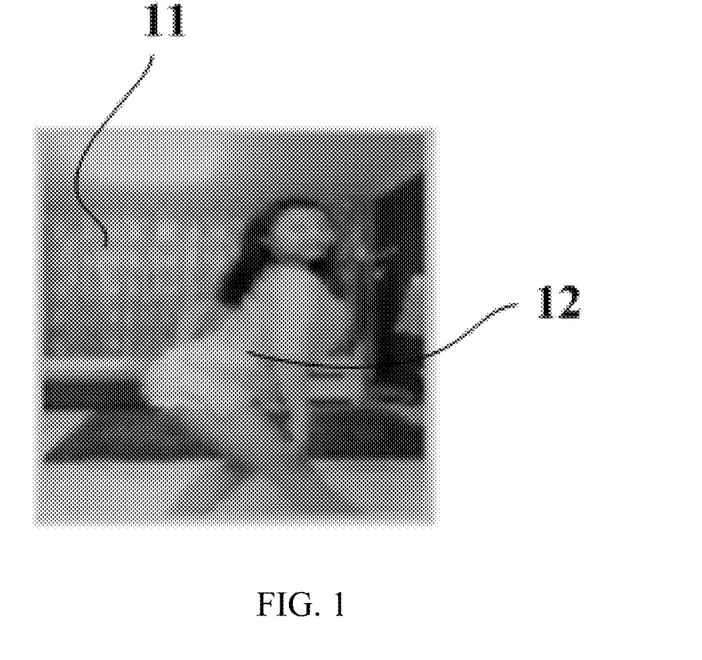
FIG. 1 is a schematic diagram of an original image with a natural background according to an embodiment of the present disclosure.

With the development of science and technologies, the mathematical image matting gradually enters people's daily lives, and develops from fixed background matting to natural background matting. FIG. 1 exemplarily shows an image with a natural background. The natural background 11 includes a curtain, a carpet and the like, and after the matting is completed, a foreground object 12 (a female) may be separated from the natural background 11 in the image, to remove the natural background 11.

The natural background matting has a good application prospect in many fields, and how to extract the foreground object is currently hot in research.

SUMMARY

In view of this, embodiments of the present disclosure provide an image processing method and a related apparatus, to precisely extract a foreground object from an original image.

To achieve the above objective, the embodiments of the present disclosure provide the following technical solutions:

According to one aspect, an embodiment of the present disclosure provides an image processing method, applied to an image processing device and including: obtaining an original image, the original image including a foreground object; extracting a foreground region from the original image through a deep neural network; identifying pixels of the foreground object from the foreground region; forming a mask according to the pixels of the foreground object, the mask including mask values corresponding to the pixels of the foreground object; and extracting the foreground object from the original image according to the mask.

According to another aspect, an embodiment of the present disclosure provides an image processing device, including at least a processor and a memory, the processor performing the foregoing image processing method by executing a program stored in the memory and calling other devices. The processor is configured to: obtain an original image, the original image including a foreground object; extracting a foreground region from the original image through a deep neural network; identify pixels of the foreground object from the foreground region; form a mask according to the pixels of the foreground object, the mask including mask values corresponding to the pixels of the foreground object; and extract the foreground object from the original image according to the mask.

According to yet another aspect, an embodiment of the present disclosure further provides a non-transitory storage medium, storing a plurality of instructions, the instructions being suitable for being loaded by a processor, to perform the operations in any one of the image processing methods provided in the embodiments of the present disclosure. The instructions cause the processor to perform: obtaining an original image, the original image including a foreground object; extracting a foreground region from the original image through a deep neural network; identifying pixels of the foreground object from the foreground region; forming a mask according to the pixels of the foreground object, the mask including mask values corresponding to the pixels of the foreground object; and extracting the foreground object from the original image according to the mask.

It may be seen that, in the image processing method provided in the embodiments of the present disclosure, an image processing device first obtains an original image including a foreground object, and performs foreground extraction on the original image through a deep neural network, to extract a foreground region; then obtains pixels of the foreground object from the foreground region, and forms a mask according to the pixels of the foreground object, the mask including mask values corresponding to the pixels of the foreground object; and further, extracts the foreground object from the original image according to the mask. The foreground object is extracted by using the mask formed according to the pixels of the foreground object, so that it can be ensured that the foreground object extracted from the original image is more precise.

DESCRIPTION OF EMBODIMENTS

The embodiments of the present disclosure provide an image processing method and a related apparatus (an image processing apparatus and an image processing device), which are applicable to scenario requirements of extracting persons (whole bodies, half bodies, and even body parts such as heads), or may be configured to extract other foreground objects (for example, vehicles).

A core concept of the present disclosure is: first obtaining an original image including a foreground object; then performing foreground extraction on the original image through a deep neural network, to obtain a foreground region; next obtaining pixels of the foreground object from the foreground region, and forming a mask according to the pixels of the foreground object, the mask including mask values corresponding to the pixels of the foreground object; and finally, extracting the foreground object from the original image according to the mask.

After the core concept is described, the following describes an apparatus involved in the embodiments of the present disclosure.

The image processing apparatus may be applied to an image processing device in a form of software or hardware. Specifically, the image processing device may be a terminal such as a desktop computer, a mobile terminal (for example, a smartphone), or an iPad, or may be a server that provides an image processing service.

In a case that the image processing apparatus is applied to the image processing device in a form of software, the image processing apparatus may be independent software. Certainly, the image processing apparatus may also be a sub-system (subcomponent) of a large system (for example, an operating system), to provide an image processing service.

In a case that the image processing apparatus is applied to the image processing device in a form of hardware, the image processing apparatus may be exemplarily a controller/processor of a terminal or a server.

Figure 2A:
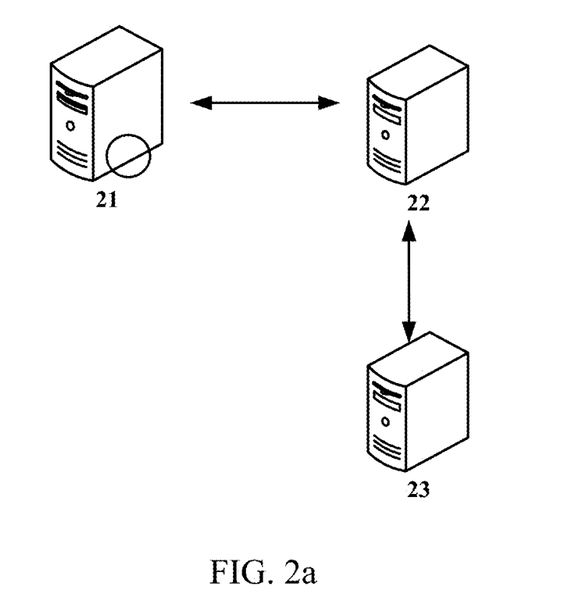
FIG. 2a is a schematic diagram of an application scenario according to an embodiment of the present disclosure.

FIG. 2a shows an exemplary application scenario (a client-server scenario) of the image processing apparatus. In addition to a web server 21 and an image processing server 22, the application scenario may further include a model training server 23.

The web server 21 is a front end (foreground), which is responsible for communicating with a client browser. The image processing server 22, the model training server 23 and the like are back ends. The image processing server 22 may provide an image processing service, and the model training server 23 may be configured to train an image processing algorithm (for example, a matting algorithm) used by the image processing server 22, or provide an image sample for training.

The image processing apparatus is deployed in the image processing server 22.

Certainly, the application scenario of the image processing apparatus may also be: A user selects a photo or video, and performs image processing (for example, matting) on the selected photo or video on a terminal (for example, a smartphone). In this case, the image processing apparatus needs to be deployed in the terminal.

Figure 2B:
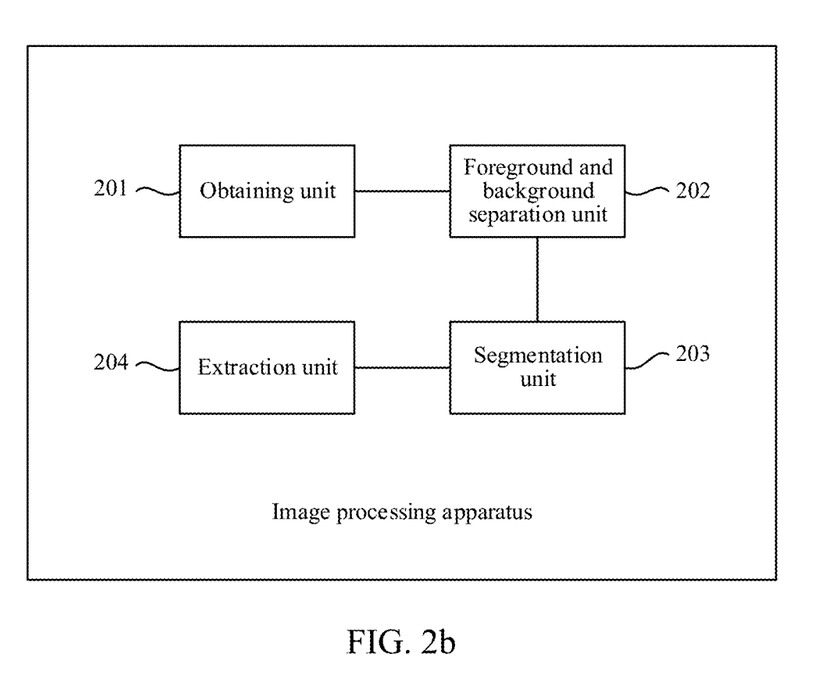
FIG. 2b is a schematic structural diagram of an image processing apparatus according to an embodiment of the present disclosure.

The following describes an internal structure of the image processing apparatus. An exemplary structure of the image processing apparatus is shown in FIG. 2b, including: an obtaining unit 201, a foreground and background separation unit 202, a segmentation unit 203, and an extraction unit 204.

The following of this specification will describe functions of the units with reference to the image processing method.

Figure 2C:
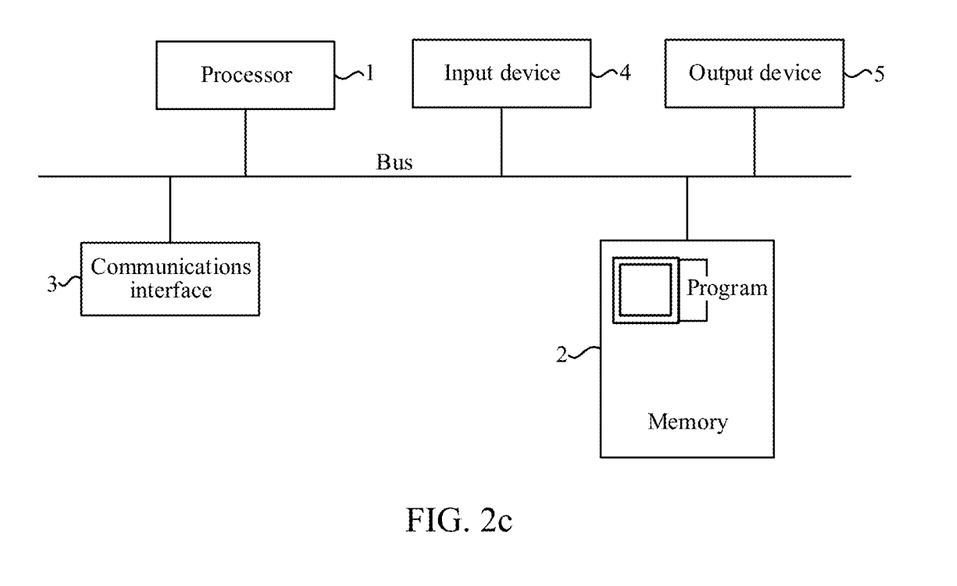
FIG. 2c is a schematic structural diagram of an image processing device according to an embodiment of the present disclosure.

FIG. 2c shows a possible schematic structural diagram of the image processing device in the foregoing embodiments. The device includes:

a bus, a processor 1, a memory 2, a communications interface 3, an input device 4, and an output device 5. The processor 1, the memory 2, the communications interface 3, the input device 4, and the output device 5 are connected to each other through the bus.

The bus may include a channel for transmitting information between components of a computer system.

The processor 1 may be a general purpose processor, for example, a general central processing unit (CPU), a network processor (NP) and a microprocessor, or may be an application-specific integrated circuit (ASIC), or one or more integrated circuits configured to control program execution of the solutions of the present disclosure. The processor 1 may alternatively be a digital signal processor (DSP), a field programmable gate array (FPGA), or other programmable logic devices, discrete gates or transistor logic devices and discrete hardware components.

The memory 2 stores a program or a script for executing the technical solutions of the present disclosure, and further stores an operating system and other mission-critical services. Specifically, the program may include program code, and the program code includes a computer operation instruction. The script is usually stored in text (for example, ASCII), and is explained or compiled only when called.

More specifically, the memory 2 may include a read-only memory (ROM), other types of static storage devices that can store static information and instructions, a random access memory (RAM), other types of dynamic storage devices that can store information and instructions, a magnetic disk memory, a flash and the like.

The input device 4 may include an apparatus for receiving data and information inputted by a user, for example, a keyboard, a mouse, a camera, a voice input apparatus, and a touch screen.

The output device 5 may include an apparatus that allows outputting information to the user, for example, a display screen and a speaker.

The communications interface 3 may include an apparatus using any type of transceiver, to communicate with other devices or communications networks, for example, an Ethernet, a radio access network (RAN), and a wireless local area network (WLAN).

It may be understood that, FIG. 2c merely shows a simplified design of the image processing device. In actual application, the image processing device may include any quantity of transmitters, receivers, processors, controllers, memories, communications interfaces and the like, and all servers/intelligent terminals that may implement the present disclosure fall within the protection scope of the present disclosure.

The processor 1 may implement the image processing method provided in the following embodiment by executing the program stored in the memory 2 and calling other devices.

In addition, the functions of the units of the image processing apparatus shown in FIG. 2b may be implemented by the processor 1 by executing the program stored in the memory 2 and calling other devices.

The foregoing image processing method and the image processing apparatus may be used for matting an image (for example, a photo) and a video. The video also consists of frames of images. Therefore, matting may be performed on each frame of the images that consist of the video, to complete matting processing on the entire video.

The matting processing on the entire video is also based on matting processing on a single image. Therefore, the following of this specification will describe the technical solutions by using an example of the matting processing on the single image.

The following will further describe the embodiments of the present disclosure in detail based on the common aspects involved in the present disclosure described above.

Figure 3:
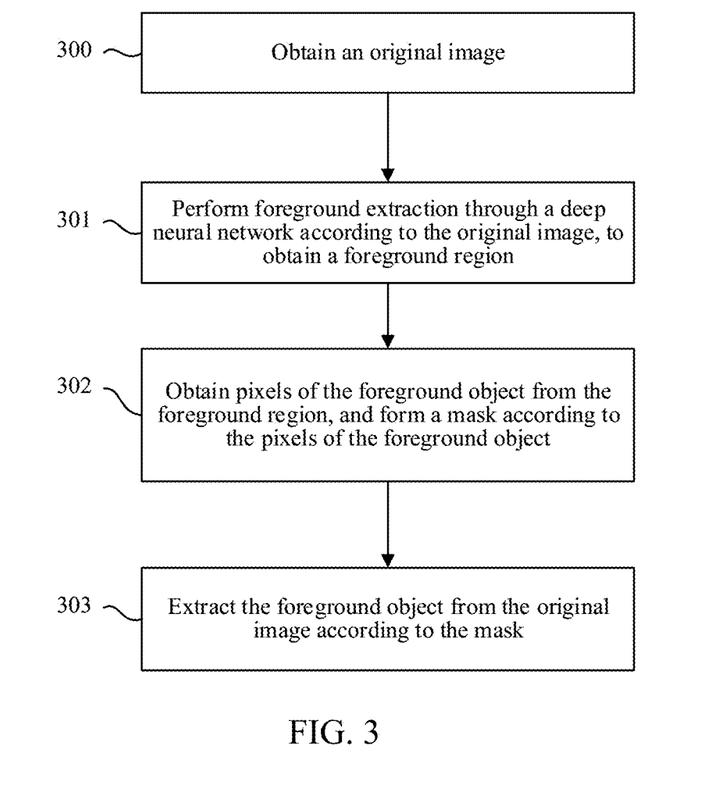
FIG. 3 is a schematic flowchart of an image processing method according to an embodiment of the present disclosure.

FIG. 3 shows an exemplary process of an image processing method performed by an image processing device. The method includes at least the following steps:

Step 300: Obtain an original image.

The original image obtained by the image processing device may include a foreground object. The foreground object is a to-be-recognized object.

FIG. 1 provides an exemplary diagram of the original image. The original image includes a natural background 11 and a foreground object 12 (a female).

In different scenarios, there is a plurality of manners for obtaining the original image by the image processing device. Using an application scenario that the image processing device is a terminal as an example, a user may start an image processing application (for example, matting software) on the terminal. An interface of the image processing application may provide a photography/camera button, and the user clicks the photography/camera button to call a shooting apparatus (for example. a camera) of the terminal to capture a photo or video. The captured photo or video may be stored in a local gallery of the terminal, and the image processing device may obtain the captured photo or video as the original image for matting.

Alternatively, the user may select a captured photo or video in the local gallery of the terminal, and start the image processing application to perform matting on the selected photo or video. The image processing application may obtain the user selected photo or video from the local gallery as the original image for subsequent matting processing. More specifically, the image processing application may be used as an image editing component (for example, an image editing component in a "beautify" option), to provide the user with an image processing service.

For another example, in a scenario that the image processing device is a server, a photo or video may be sent from a client to a server side, so that an image processing apparatus deployed at the server side may obtain the photo or video provided by the client as the original image.

In an embodiment, step 300 may be performed by the obtaining unit 201.

Step 301: Perform foreground extraction through a deep neural network according to the original image, to obtain a foreground region. In other words, the foreground region is extracted from the original image by using a deep neural network.

In an embodiment, step 301 may be performed by the foreground and background separation unit 202.

In the original image, a part outside the foreground region is a background region.

An image generally consists of a plurality of pixels, and during specific implementation, the image processing device may determine whether each pixel in the original image is a foreground pixel/point or a background pixel/point. If the pixel is the background point, a first pixel value (for example, 0) may be allocated to the pixel to identify the pixel as the background; and if the pixel is the foreground point, a second pixel value (for example, 255) may be allocated to the pixel to identify the pixel as the foreground. Using the original image shown in FIG. 1 as an example, an obtained image including the foreground region may be shown in FIG. 4a.

Alternatively, the image processing device may allocate, when the pixel is determined as the background point, a fixed pixel value (for example, 0 or 255) to the pixel, and keep the pixel value unchanged when the pixel is determined as the foreground point. Using the original image shown in FIG. 1 as an example, an obtained image including the foreground region may be shown in FIG. 4a.

Figure 4A:
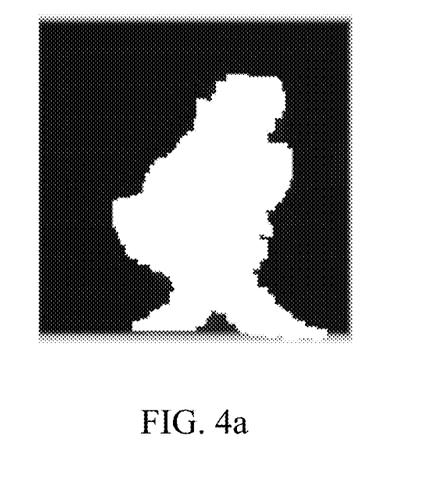
FIG. 4a is a schematic diagram of an image including a foreground region according to an embodiment of the present disclosure.

It may be seen from the foregoing descriptions that the foreground region consists of foreground points.

Figure 4B:
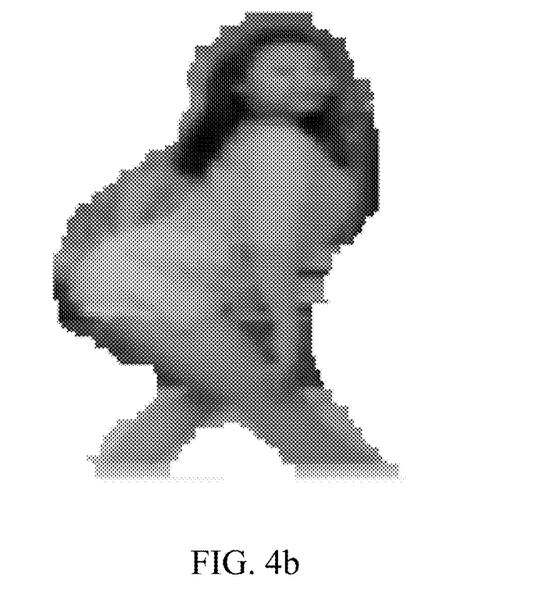
FIG. 4b is a schematic diagram of another image including a foreground region according to an embodiment of the present disclosure.

As shown in FIG. 4a and FIG. 4b, the foreground region may include the foreground object and a part of the background in the FIG. 1, and the background will further be removed subsequently.

During specific implementation, the image processing device may extract the foreground region by using a plurality of algorithms or models, for example, extract the foreground region by using a mixture Gaussian background model, a deep neural network and the like. A person skilled in the art may perform flexible selection and design according to needs, which is not described herein again.

Step 302: Obtain pixels of the foreground object from the foreground region, and form a mask according to the pixels of the foreground object.

Compared with the foreground and background separation in step 301, step 302 performs a more precise segmentation.

The mask may include mask values corresponding to the pixels of the foreground object.

Step 302 may be performed by the segmentation unit 203.

The image processing device may obtain the pixels of the foreground object from the foreground region by using a plurality of algorithms, for example, may perform a more precise segmentation by using a graph cut algorithm, to segment the foreground region into the pixels of the foreground object and pixels of the background (i.e., background pixels).

In an example, the first pixel value (for example, 0) may be allocated to the segmented pixels that makes up the background, and the second pixel value (for example, 255) may be allocated to the segmented pixels that makes up the foreground object. The first pixel value and the second pixel value are both the mask values.

Figure 5:
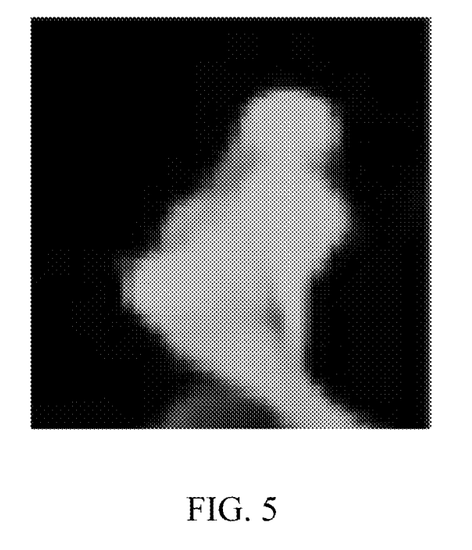
FIG. 5 is a schematic diagram of a mask according to an embodiment of the present disclosure.

Using the original image shown in FIG. 1 as an example, the mask obtained by using the graph cut algorithm may be shown in FIG. 5.

In other examples, the image processing device may further divide the foreground region into a plurality of subregions, segment each subregion by using the graph cut algorithm, to obtain a sub segmentation result, and then combine the sub segmentation results, to finally form the mask.

Step 303: Extract the foreground object from the original image according to the mask.

For how to extract the foreground object from the original image by using the mask, reference may be made to the existing manner, which is not described herein again.

It may be seen that, in the image processing method provided in the embodiments of the present disclosure, an image processing device first obtains an original image including a foreground object, and performs foreground extraction on the original image through a deep neural network, to extract a foreground region; then obtains pixels of the foreground object from the foreground region, and forms a mask according to the pixels of the foreground object, the mask including mask values corresponding to the pixels of the foreground object; and further, extracts the foreground object from the original image according to the mask. The foreground object is extracted by using the mask formed according to the pixels of the foreground object, so that it can be ensured that the foreground object extracted from the original image is more precise.

The following will perform a more detailed description by using the deep neural network with reference to the graph cut algorithm as an example.

The deep neural network consists of "neurons" by hierarchy, in which weights and offsets may both be obtained through training.

The deep neural network includes an input layer and an output layer, and there is a plurality of hidden layers between the input layer and the output layer. Each hidden layer consists of a plurality of neurons and the neurons at the same layer are not connected. An output of each layer is used as an input of a next layer.

Certainly, the deep neural network needs to be trained in advance, and the trained deep neural network may be used as the image processing apparatus or a component of the image processing apparatus, to complete the matting operation.

In the embodiments of the present disclosure, the extraction of the foreground region may be completed through the deep neural network, and the pixels of the foreground object may be obtained from the foreground region by using the graph cut algorithm.

In this case, the foreground and background separation unit 202 may be specifically the deep neural network, or a callable deep neural network, and the segmentation unit 203 may execute or call the graph cut algorithm.

During implementation, the graph cut algorithm may be executed by a branch (or a hidden layer) of the deep neural network. In this case, the deep neural network may implement functions of the foreground and background separation unit 202, and functions of the segmentation unit 203. Certainly, the graph cut algorithm may further be executed through a network or an algorithm module other than the deep neural network. That is, the functions of the foreground and background separation unit 202 and the functions of the segmentation unit 203 are separately executed.

Figure 6:
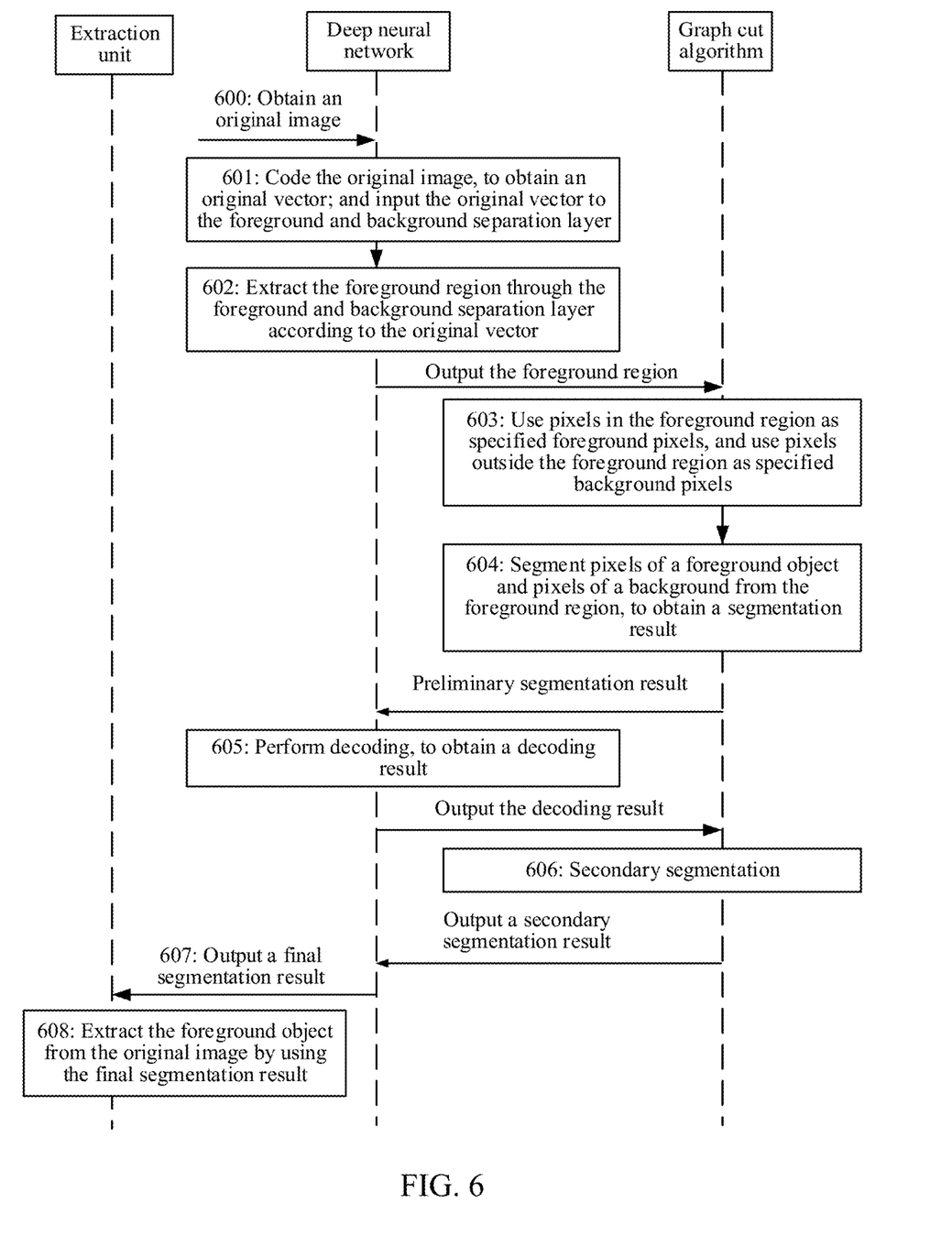
FIG. 6 is a schematic flowchart of an image processing method according to an embodiment of the present disclosure.

FIG. 6 shows an exemplary process of an image processing method implemented through the deep neural network with reference to the graph cut algorithm. In some embodiments, the deep neural network may include a foreground and background separation layer, and the method includes at least the following steps:

Step 600: A deep neural network obtains an original image.

Step 600 is similar to step 300, which is not described herein again.

Step 601: The deep neural network codes the original image, to obtain an original vector; and inputs the original vector to a foreground and background separation layer.

A fixed vector may be obtained by coding the original image, that is, a fixed feature is obtained.

In image processing, an image is usually represented as a vector, for example, an image of 1000×1000 may be represented as a vector of 1000000.

The deep neural network generally may only operate a vector of a specific length (the length is determined by the input layer of the deep neural network), so that the image needs to be expanded to a vector (that is, the image is represented through the vector) to be inputted to the deep neural network. Step 601 codes the original image, and a vector with the length required by the deep neural network may be obtained.

Step 602: The deep neural network extracts the foreground region through the foreground and background separation layer according to the inputted original vector.

For related descriptions of the foreground region, reference may be made to the descriptions of step 301, which is not described herein again.

In practice, using hair as an example, if the hair is blown up by wind, pixels between the hair may be determined as foreground points. Therefore, after the foreground region is obtained, refined treatment needs to be performed on the foreground region subsequently.

In addition to the foreground region, the input layer or other layers (for example, the foreground and background separation layer) of the deep neural network may further extract at least one of pixel-level features and abstract features of the original vector.

The pixel-level features may include colors, shapes, edges, texture features and the like.

The abstract features may include identifying key features, for example, whether there is a person, whether the foreground included in the image is a person or a dog, and the like.

Step 603: Use pixels in the foreground region as specified foreground pixels, and use pixels outside the foreground region as specified background pixels.

The existing graph cut algorithm requires the user to specify a part of the foreground and a part of the background of the image in an interactive means, that is, requires the user to specify some seeds of the foreground object and the background. In many cases, the user cannot specify foreground seeds and background seeds precisely for a plurality of reasons such as a lack of experience.

In some embodiments, because the foreground region is obtained in step 602, some pixels in the foreground region may be automatically used as the foreground seeds (e.g., foreground seed pixels), and the pixels outside the foreground region may be used as the background seeds (e.g., background seed pixels). In addition to simplifying the process, a problem that the user cannot specify a part of the foreground and a part of the background precisely is further avoided.

Step 603 may be performed by the foreground and background separation unit 202, or may be performed by the segmentation unit 203 for executing the graph cut algorithm.

Step 604: Segment the pixels of the foreground object and the pixels of the background from the foreground region by using the graph cut algorithm (according to the foreground seeds and the background seeds), to obtain a segmentation result.

The foreground region obtained in step 602 may include the foreground object and a part of the background. Therefore, the foreground region needs to be segmented, to further separate the foreground object from the foreground region.

In some embodiments, the two segmentations will be performed by using the graph cut algorithm, so the segmentation result obtained in step 604 may be called a preliminary segmentation result (or be called a preliminary mask). For how to set the mask value, reference may be made to the foregoing descriptions, which is not described herein again.

Certainly, in other embodiments of the present disclosure, the graph cut algorithm may be used to perform the segmentation for only once, and in this case, the following step 606 does not need to be performed.

The graph cut algorithm may associate an image segmentation problem with a min cut problem of the image, and divide a vertex of the image into two disjoint subsets. The two subsets are respectively corresponding to a foreground pixel set and a background pixel set. The foreground pixel set includes the pixels of the foreground object and the background pixel set includes the pixels of the background, so as to complete the segmentation of the foreground and the background of the image. The graph cut algorithm is a relatively mature algorithm, and how the graph cut algorithm performs the segmentation by using the foreground seeds and the background seeds is not described herein.

Then, the graph cut algorithm may input the preliminary segmentation result to the deep neural network. According to the foregoing descriptions, the preliminary segmentation result inputted to the deep neural network is in a vector form.

Certainly, if the graph cut algorithm is executed by a hidden layer of the deep neural network, the preliminary segmentation result is also a vector, and the hidden layer may output the preliminary segmentation result to a next layer for decoding.

Step 605: The deep neural network decodes the preliminary segmentation result, to obtain a decoding result.

The above mentions that the preliminary segmentation result is a vector, and the decoding will restore the vector of the preliminary segmentation result to an image.

To distinguish from a decoding result in the following embodiments, the decoding result obtained in step 604 may be called a first decoding result or a first decoding result image.

In an example, if the deep neural network is a convolutional deep neural network, deconvolution may be performed on the vector, to obtain the first decoding result.

A size of the first decoding result is determined by a dimension of the output layer of the deep neural network.

It needs to be understood that, in some possible implementations, a mask for extracting the foreground object may be directly formed according to the first decoding result, that is, the following step 606 does not need to be performed.

Step 606: Perform a secondary segmentation on the (first) decoding result by using the graph cut algorithm, to obtain a secondary segmentation result.

During the secondary segmentation, the pixels in the foreground pixel set and the background pixel set obtained in the preliminary segmentation may be used as the foreground seeds and the background seeds.

In other embodiments of the present disclosure, before the secondary segmentation, the first decoding result may further be converted to a data form that the graph cut algorithm needs, and then the secondary segmentation is performed. The secondary segmentation result may be called a secondary mask. For how to set the mask value, reference may be made to the foregoing descriptions, which is not described herein again.

Step 607: The deep neural network outputs a final segmentation result.

The final segmentation result is also a mask. Using the original image in FIG. 1 as an example, the mask obtained by processing by using the technical solutions provided in some embodiments may be shown in FIG. 5. It may be seen that, in this example, the hair and the background are precisely separated.

During specific implementation, according to the features extracted in step 602, the extracted foreground region may be divided into a plurality of subregions, and different tasks perform the processing of step 603 to step 606 on the subregions, to obtain a plurality of secondary sub segmentation results. Then, the plurality of secondary sub segmentation results are combined in step 607 to obtain the final segmentation result and the final segmentation result is outputted.

More specifically, using that the foreground region includes a person as an example, different parts/shapes (heads, arms, torsos, and the like) may be identified according to at least one of the pixel-level features and the abstract features. The foreground region is divided to subregions according to identification results, and different subregions include different parts (for example, a subregion of the head, a subregion of the arm, a subregion of the torso, and the like), or it may be considered that different subregions present different shapes. Then, the tasks (for example, a head processing task, an arm processing task, and a torso processing task) for processing different parts perform the processing of step 603 to step 606 on the subregions.

In an example, the deep neural network may include a plurality of interfaces (branches), each interface is corresponding to one task and each task is responsible for different functions. For example, preliminary portrait segmentation (step 604), decoding, secondary portrait segmentation (step 606) may be performed on the foreground region by a plurality of tasks, and each task focuses on different parts. For example, task A processes best on the head, some tasks process best on the arm, and some tasks process best on the torso. Therefore, different parts may be processed by different tasks. Finally, the segmentation results obtained by the plurality of tasks are combined to obtain the final segmentation result and the final segmentation result is outputted.

Certainly, if the foreground region is not divided into the plurality of subregions for processing, the secondary segmentation result may be directly outputted as the final segmentation result.

In other embodiments, the final segmentation result may be outputted by using the graph cut algorithm.

Step 604, step 606 and step 607 may all be performed by the segmentation unit 203.

Step 608: Extract the foreground object from the original image by using the final segmentation result.

If a size (resolution) of the outputted final segmentation result is not corresponding to the original image, the size of the final segmentation result may be converted to a size corresponding to the original image.

Figure 7A:
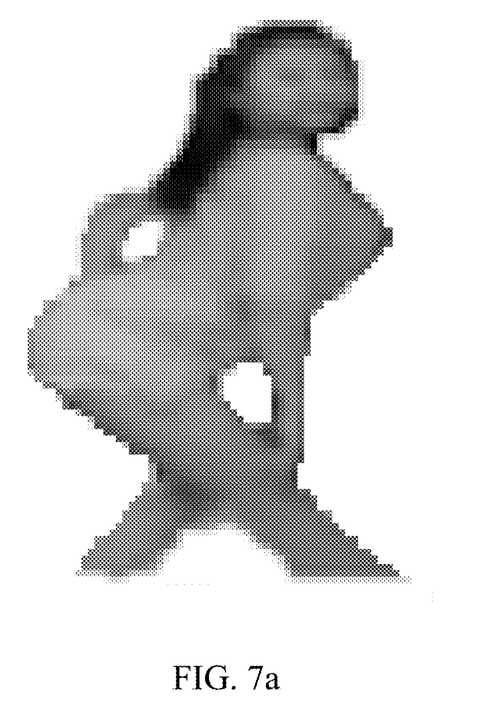
FIG. 7a is a schematic diagram of an extracted foreground object according to an embodiment of the present disclosure.

Using the original image shown in FIG. 1 as an example, the extracted foreground object may be shown in FIG. 7a.

Figure 7B:
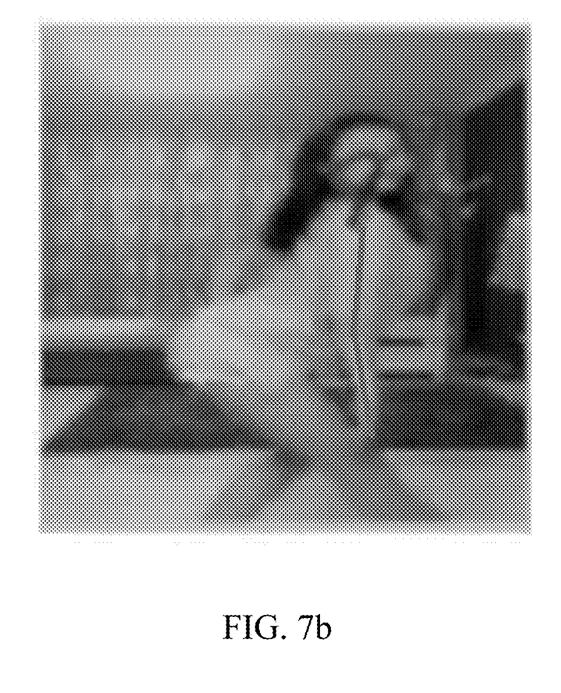
FIG. 7b is a schematic diagram of a result obtained after gesture recognition according to an embodiment of the present disclosure.

In other embodiments of the present disclosure, after the foreground object is extracted, gesture recognition may further be performed based on the foreground object, so that the body may be identified, analyzed, and tracked. For example, FIG. 7b is a result obtained after the gesture/posture recognition. In FIG. 7b, postures of the head and the arms are marked with lines (e.g., a line to mark the position/ direction of the head and a line to mark the position/direction of the main body or a body extremity).

In some embodiments, the deep neural network may be used for both foreground object recognition and gesture/posture recognition. For example, the above-described encoding process may be integrated into a first stage of the gesture recognition process, and the above-described decoding process may be integrated into a second stage of the gesture recognition process. The deep learning feature extraction module/result can be shared and used in both foreground object recognition and gesture recognition. In other words, one neural network model can be used in two types of tasks, thereby saving system resource and enhancing recognition efficiency.

Step 608 may be performed by the extraction unit 204. In other embodiments of the present disclosure, the function of the extraction unit 204 may further be completed by a layer of the deep neural network.

Figure 8:
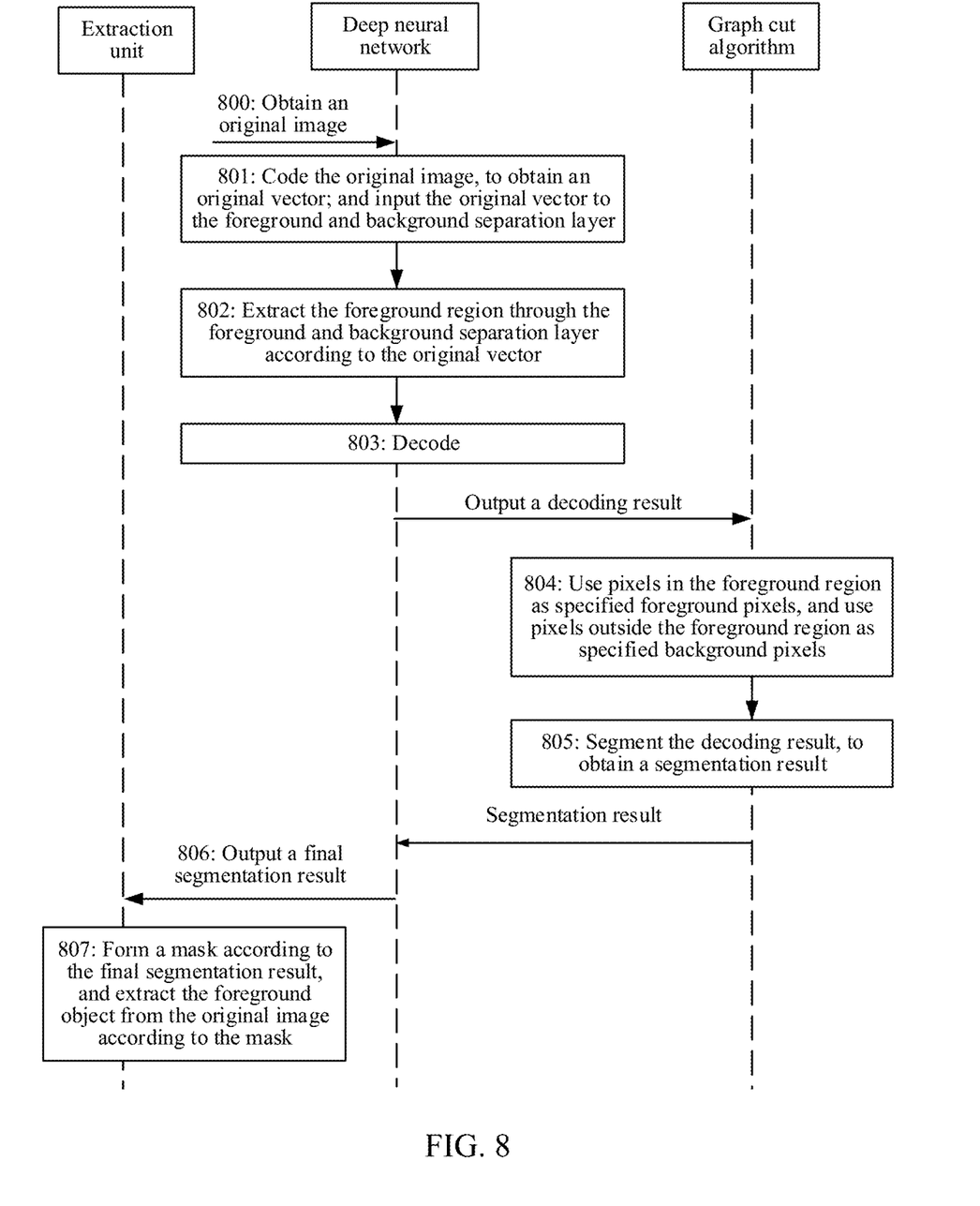
FIG. 8 is a schematic flowchart of an image processing method according to an embodiment of the present disclosure.

In addition, in other embodiments of the present disclosure, the graph cut algorithm may be performed after the decoding. FIG. 8 shows an exemplary process, including at least the following steps:

Step 800 to step 802 are similar to step 600 to step 602, which are not described herein again.

Step 803: The deep neural network decodes the foreground region, to obtain a second decoding result or a second decoding result image.

For related description of the decoding, reference may be made to the description of step 605, which is not described herein again.

Step 804 is similar to step 603, which is not described herein again.

Step 805: Segment the pixels of the foreground object and the pixels of the background from the foreground region corresponding to the second decoding result by using the graph cut algorithm, to obtain a segmentation result; the segmentation result being used for forming the mask in the following operation.

Step 805 is similar to step 604, which is not described herein again.

Step 806: Output a final segmentation result.

During specific implementation, according to the features extracted in step 802, the extracted foreground region may be divided into a plurality of subregions, and different tasks perform the processing of step 805 on the subregions, to obtain a plurality of secondary sub segmentation results. Then, the plurality of secondary sub segmentation results are combined in step 806 to obtain the final segmentation result and the final segmentation result is outputted.

Certainly, if the foreground region is not divided into the plurality of subregions, the segmentation result obtained in step 805 may be directly outputted as the final segmentation result.

Step 806 is similar to step 607, which is not described herein again.

Step 807: Form a mask according to the final segmentation result, and extract the foreground object from the original image according to the mask.

Step 807 is similar to step 608, which is not described herein again.

In the existing image processing method, matting processing may be directly performed on the original image by using the graph cut algorithm. Compared to the method, in some embodiments of the present disclosure, first the foreground region is extracted, and then the foreground region is segmented by using the graph cut algorithm. Because less background is included in the foreground region, a more effective and more precise segmentation may be performed.

In addition, the existing graph cut algorithm requires the user to specify a part of the foreground and a part of the background of the image in an interactive means, that is, requires the user to specify some seeds of the foreground object and the background. In many cases, the user cannot specify foreground seeds and background seeds precisely for a plurality of reasons such as a lack of experience.

In some embodiments, because the foreground region is extracted in advance, some pixels in the foreground region may be automatically used as the foreground seeds, and some pixels outside the foreground region may be used as the background seeds. In addition to simplifying the process, a problem that the user cannot specify a part of the foreground and a part of the background precisely is further avoided.

In addition, the existing mating method may perform matting by using an adversarial learning network, but the adversarial learning network cannot perform matting well in a complex background because the matting of the adversarial learning network is not pixel-level. The matting of this application is pixel-level, and is more suitable for matting in the complex background.

The following briefly describes the apparatus involved in the embodiments of the present disclosure.

It is mentioned above that the image processing apparatus includes: the obtaining unit 201, the foreground and background separation unit 202, the segmentation unit 203, and the extraction unit 204.

In other embodiments of the present disclosure, in an aspect of obtaining the pixels of the foreground object, the segmentation unit 203 in all the foregoing embodiments may be specifically configured to:

segment the pixels of the foreground object and the pixels of the background from the foreground region by using the graph cut algorithm, to obtain a segmentation result;

decode the segmentation result, to obtain a first decoding result, the first decoding result being used for forming the mask; and form the mask according to the first decoding result.

Alternatively, in the aspect of obtaining the pixels of the foreground object, the segmentation unit 203 in all the foregoing embodiments may be specifically configured to:

decode the foreground region, to obtain a second decoding result;

segment the pixels of the foreground object and the pixels of the background from the second decoding result by using the graph cut algorithm, to obtain a segmentation result, the segmentation result being used for forming the mask; and form the mask according to the segmentation result.

For related descriptions, reference may be made to the foregoing descriptions, which are not described herein again.

Before segmenting the pixels of the foreground object and the pixels of the background from the foreground region by using the graph cut algorithm, the segmentation unit 203 is further configured to:

use the pixels in the foreground region as specified foreground pixels, and use the pixels outside the foreground region as specified background pixels.

For related descriptions, reference may be made to the foregoing descriptions, which are not described herein again.

In addition, in other embodiments of the present disclosure, the segmentation unit 203 may further divide the foreground region or the second decoding result into a plurality of subregions, and segment each of the subregions by using the graph cut algorithm, to obtain a sub segmentation result; and combine the sub segmentation results, to obtain a segmentation result, the segmentation result being used for forming the mask.

In the image processing apparatus provided in the embodiments of the present disclosure, an original image including a foreground object is first obtained, and foreground extraction is performed on the original image through a deep neural network, to extract a foreground region; and pixels of the foreground object are then obtained from the foreground region, and a mask is formed according to the pixels of the foreground object, the mask including mask values corresponding to the pixels of the foreground object; and further, the foreground object is extracted from the original image according to the mask. The foreground object is extracted by using the mask formed according to the pixels of the foreground object, so that it can be ensured that the foreground object extracted from the original image is more precise.

An embodiment of the present disclosure further includes an image processing device, including at least a processor and a memory. The processor performs the image processing method by executing a program stored in the memory and calling other devices.

An embodiment of the present disclosure further includes a storage medium, storing a plurality of instructions. The instructions are suitable for being loaded by a processor, to perform the operations in the image processing method provided in any one of the embodiments of the present disclosure.

An embodiment of the present disclosure further includes a computer program product, including instructions. When run in a computer, the computer program product causes the computer to perform the operations in the image processing method provided in any one of the embodiments of the present disclosure.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art can use different methods to implement the described functions for each particular application, but it shall not be considered that the implementation goes beyond the scope of the present disclosure.

In combination with the embodiments herein, steps of the method or algorithm described may be directly implemented using hardware, a software unit executed by a processor, or the combination thereof. The software unit may be placed in a RAM, a memory, a ROM, an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use the present disclosure. Various modifications to these embodiments are obvious to persons skilled in the art, the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. An image processing method, applied to an image processing device, the method comprising:
  obtaining an original image, the original image comprising a foreground object;
  extracting a foreground region from the original image through a deep neural network, wherein the deep neural network includes a plurality of interfaces, the plurality of interfaces include a first interface and a second interface different than the first interface, and wherein extracting the foreground region comprises:
    dividing the foreground region into a plurality of subregions including a first subregion and a second subregion different than the first subregion; and
    processing the first subregion through a first task corresponding to the first interface, and processing the second subregion through a second task corresponding to the second interface;
  identifying pixels of the foreground object from the foreground region;
  forming a mask according to the pixels of the foreground object, the mask comprising mask values corresponding to the pixels of the foreground object; and
  extracting the foreground object from the original image according to the mask.

2. The method according to claim 1, wherein the deep neural network comprises a foreground and background separation layer, and the extracting the foreground region through the deep neural network comprises:
  coding the original image, to obtain an original vector; and
  inputting the original vector to the foreground and background separation layer, and extracting the foreground region through the foreground and background separation layer.

3. The method according to claim 1, wherein the identifying pixels of the foreground object from the foreground region, and forming a mask according to the pixels of the foreground object comprises:
  segmenting the foreground region into the pixels of the foreground object and background pixels by using a graph cut algorithm, to obtain a segmentation result;
  decoding the segmentation result, to obtain a first decoding result image; and
  forming the mask according to the first decoding result image.

4. The method according to claim 3, wherein before the segmenting the foreground region, the method further comprises:
  specifying a pixel in the foreground region as a foreground seed pixel; and
  specifying a pixel outside the foreground region as a background seed pixel, the foreground seed pixel and the background seed pixel being used in the graph cut algorithm to segment the foreground region into the pixels of the foreground object and the background pixels.

5. The method according to claim 1, wherein the obtaining pixels of the foreground object from the foreground region, and forming a mask according to the pixels of the foreground object comprises:
decoding the foreground region, to obtain a second decoding result image;
segmenting the second decoding result image into the pixels of the foreground object and background pixels by using a graph cut algorithm, to obtain a segmentation result; and
forming the mask according to the segmentation result.

6. The method according to claim 5, wherein before the segmenting the second decoding result image, the method further comprises:
specifying a pixel in the foreground region as a foreground seed pixel; and
specifying a pixel outside the foreground region as a background seed pixel, the foreground seed pixel and the background seed pixel being used in the graph cut algorithm to segment the second decoding result image into the pixels of the foreground object and the background pixels.

7. The method according to claim 1, wherein the identifying pixels of the foreground object from the foreground region, and forming a mask according to the pixels of the foreground object comprises:
segmenting each subregion by using a graph cut algorithm, to obtain a sub segmentation result;
combining the sub segmentation results, to obtain a segmentation result; and
forming the mask according to the segmentation result.

8. The method according to claim 1, wherein the deep neural network includes a foreground layer and a background layer, and extracting the foreground region through the deep neural network comprises:
representing the original image with a vector;
inputting the vector into the deep neural network; and
extracting the foreground region through the foreground layer and the background layer of the deep neural network according to the vector as inputted.

9. The method according to claim 1, wherein the foreground object includes a head portion, an arm portion, a body portion, and a leg portion, and wherein the first subregion and the second subregion each independently include one of the head portion, the arm portion, the body portion, or the leg portion.

10. An image processing device, comprising at least a processor and a memory; the processor being configured to:
obtain an original image, the original image comprising a foreground object;
extract a foreground region from the original image through a deep neural network, wherein the deep neural network includes a plurality of interfaces, the plurality of interfaces include a first interface and a second interface different than the first interface, and wherein the foreground region is extracted by:
dividing the foreground region into a plurality of subregions including a first subregion and a second subregion different than the first subregion; and
processing the first subregion through a first task corresponding to the first interface, and processing the second subregion through a second task corresponding to the second interface;
identify pixels of the foreground object from the foreground region; form a mask according to the pixels of the foreground object, the mask comprising mask values corresponding to the pixels of the foreground object; and
extract the foreground object from the original image according to the mask.

11. The device according to claim 10, wherein the deep neural network comprises a foreground and background separation layer, and when extracting the foreground region through the deep neural network, the processors is further configured to:
code the original image, to obtain an original vector; and
input the original vector to the foreground and background separation layer, and extract the foreground region through the foreground and background separation layer.

12. The device according to claim 10, wherein the processors is further configured to:
segment the foreground region into the pixels of the foreground object and background pixels by using a graph cut algorithm, to obtain a segmentation result;
decode the segmentation result, to obtain a first decoding result image; and
form the mask according to the first decoding result image.

13. The device according to claim 10, wherein the processors is further configured to:
decode the foreground region, to obtain a second decoding result image;
segment the second decoding result image into the pixels of the foreground object and background pixels by using a graph cut algorithm, to obtain a segmentation result; and
form the mask according to the segmentation result.

14. The device according to claim 13, wherein before the segmenting the second decoding result image, the processors is further configured to:
specify a pixel in the foreground region as a foreground seed pixel; and
specify a pixel outside the foreground region as a background seed pixel, the foreground seed pixel and the background seed pixel being used in the graph cut algorithm to segment the second decoding result image into the pixels of the foreground object and the background pixels.

15. The device according to claim 10, wherein the processors is further configured to:
segment each subregion by using a graph cut algorithm, to obtain a sub segmentation result;
combine the sub segmentation results, to obtain a segmentation result; and
form the mask according to the segmentation result.

16. A non-transitory computer readable storage medium, storing a plurality of instructions, and when loaded by a processor, the instructions causing the processor to perform:
obtaining an original image, the original image comprising a foreground object;
extracting a foreground region from the original image through a deep neural network, wherein the deep neural network includes a plurality of interfaces, the plurality of interfaces include a first interface and a second interface different than the first interface, and wherein extracting the foreground region comprises:
dividing the foreground region into a plurality of subregions including a first subregion and a second subregion different than the first subregion; and processing the first subregion through a first task corresponding to the first interface, and processing the second subregion through a second task corresponding to the second interface;

identifying pixels of the foreground object from the foreground region;

forming a mask according to the pixels of the foreground object, the mask comprising mask values corresponding to the pixels of the foreground object; and extracting the foreground object from the original image according to the mask.

17. The storage medium according to claim 16, wherein the deep neural network comprises a foreground and background separation layer, and the extracting the foreground region through the deep neural network comprises:

coding the original image, to obtain an original vector; and inputting the original vector to the foreground and background separation layer, and extracting the foreground region through the foreground and background separation layer.

18. The storage medium according to claim 16, wherein the identifying pixels of the foreground object from the foreground region, and forming a mask according to the pixels of the foreground object comprises:

segmenting the foreground region into the pixels of the foreground object and background pixels by using a graph cut algorithm, to obtain a segmentation result;

decoding the segmentation result, to obtain a first decoding result image; and forming the mask according to the first decoding result image.

19. The storage medium according to claim 16, wherein the obtaining pixels of the foreground object from the foreground region, and forming a mask according to the pixels of the foreground object comprises:

decoding the foreground region, to obtain a second decoding result image;

segmenting the second decoding result image into the pixels of the foreground object and background pixels by using a graph cut algorithm, to obtain a segmentation result; and forming the mask according to the segmentation result.

20. The storage medium according to claim 16, wherein the identifying pixels of the foreground object from the foreground region, and forming a mask according to the pixels of the foreground object comprises:

segmenting each subregion by using a graph cut algorithm, to obtain a sub segmentation result; combining the sub segmentation results, to obtain a segmentation result; and forming the mask according to the segmentation result.

* * * * *